(12) United States Patent
Grant (10) Patent No.: US 12,323,417 B2
(45) Date of Patent: Jun. 3, 2025

(54) TEMPORARY TWO FACTOR HEATING, VENTILATING, AND AIR CONDITIONING (HVAC) APPLIANCE AUTHENTICATION

(71) Applicant: Midea Group Co., Ltd., Foshan (CN)

(72) Inventor: Michael Grant, Taylorsville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 242 days.

(21) Appl. No.: 18/189,280

(22) Filed: Mar. 24, 2023

(65) Prior Publication Data

US 2024/0323179 A1    Sep. 26, 2024

(51) Int. Cl.
*H04L 9/40* (2022.01)
*F24F 11/56* (2018.01)
*H04L 67/12* (2022.01)

(52) U.S. Cl.
CPC .......... *H04L 63/0846* (2013.01); *F24F 11/56* (2018.01); *H04L 67/12* (2013.01)

(58) Field of Classification Search
CPC ....... H04L 63/0846; H04L 67/12; F24F 11/56
See application file for complete search history.

(56) References Cited

U.S. PATENT DOCUMENTS

| | | | |
|---|---|---|---|
| 6,644,557 B1 * | 11/2003 | Jacobs | F24F 11/30 726/16 |
| 10,420,879 B2 | 9/2019 | Heck et al. | |
| 11,553,320 B1 * | 1/2023 | Hutz | G08B 17/00 |
| 2013/0086655 A1 * | 4/2013 | Karp | G06F 21/45 726/6 |
| 2015/0005953 A1 * | 1/2015 | Fadell | F24F 11/67 700/276 |
| 2015/0279134 A1 * | 10/2015 | Warren | H04W 12/06 340/5.85 |
| 2016/0209062 A1 * | 7/2016 | Castillo | F24F 11/62 |
| 2017/0202037 A1 | 7/2017 | Hong et al. | |
| 2017/0202039 A1 | 7/2017 | Logue et al. | |
| 2018/0012460 A1 * | 1/2018 | Heitz, III | G08B 13/19682 |
| 2018/0077741 A1 * | 3/2018 | Pan | H04W 88/02 |
| 2018/0310176 A1 * | 10/2018 | Abdelhakim | H04W 12/02 |
| 2018/0368058 A1 | 12/2018 | Huang et al. | |

(Continued)

OTHER PUBLICATIONS

Sharp Electronics Corporation; Wi-Fi Connect Guide Microwave Drawer Model SMD2489ES; 8 pages; dated 2019.

(Continued)

*Primary Examiner* — Javier O Guzman
(74) *Attorney, Agent, or Firm* — Gray Ice Higdon (57) ABSTRACT

A Package Terminal Air Conditioner (PTAC) or other room Heating, Ventilation, and Air Conditioning (HVAC) appliance may present a temporary authentication code to a user staying in a room in which the room HVAC appliance is installed to enable the user to authenticate his or her mobile device and control the room HVAC appliance during their stay. The temporary authentication code is valid for a limited duration, such that a user previously authenticated to the room HVAC appliance loses authentication, and is required to re-authenticate with a new temporary authentication code when the prior temporary authentication code has expired. As such, a user lacking physical access to the room HVAC appliance, such as after the user's stay has ended, is no longer able to access the room HVAC appliance.

20 Claims, 5 Drawing Sheets

(56) References Cited

U.S. PATENT DOCUMENTS

| | | |
|---|---|---|
| 2019/0333020 A1 | 10/2019 | Zhao et al. |
| 2019/0353367 A1* | 11/2019 | Atchison ................ G05B 15/02 |
| 2020/0258378 A1 | 8/2020 | Davis |
| 2020/0262391 A1 | 8/2020 | Pham |
| 2021/0409954 A1 | 12/2021 | Frisk et al. |
| 2022/0021684 A1* | 1/2022 | Mensah ................ H04L 63/105 |
| 2022/0109669 A1 | 4/2022 | Yuh et al. |
| 2023/0275877 A1* | 8/2023 | Harel ................ G01C 21/3822 |
| | | 713/189 |

OTHER PUBLICATIONS

Whirlpool Corporation; Scan to Connect; 1 page; retrieved from https://producthelp.whirlpool.com/Connected_Appliances/Product_Info/Connected_Support/Scan_To_Connect; retrieved on Oct. 3, 2022.

Midea; Midea Air App and Smart Home Skills Instructions; 26 pages; Midea User Manual; retrieved on Jan. 11, 2023.

\* cited by examiner

TEMPORARY TWO FACTOR HEATING, VENTILATING, AND AIR CONDITIONING (HVAC) APPLIANCE AUTHENTICATION

BACKGROUND

A wide variety of different types of appliances are increasingly controllable by mobile devices such as mobile phones, tablets, laptop computers, and the like. For example, smart thermostats have become increasingly popular in many homes, allowing users to control the heating, ventilation, and air conditioning (HVAC) systems in their homes through apps running on their mobile phones, even when users are away from home.

Providing similar controllability for users in other situations is somewhat more problematic. For example, hotels often include in-room thermostats that allow users to control the environmental conditions in their rooms, and many users would find it convenient to be able to control the environmental conditions in their rooms using their personal mobile devices in a similar manner to their own residences. Some hotels support apps that allow users to control their room thermostat and lighting; however, support for such apps often requires substantial infrastructure support within a hotel, including the installation of smart devices and controllers and access to the Internet to allow the smart devices and controllers to access cloud services that allow for users to be matched to the devices in their individual rooms, and prohibit unauthorized users from accessing the devices in other rooms.

In many applications, however, such extensive infrastructure is economically and/or practically infeasible. Many lower cost hotels, for example, may only have limited Internet capability, particularly when the hotels are older, spread out over one or two floors, and built well before computer and networking became commonplace. Many of these hotels also do not have centralized HVAC systems, and rely instead on individual room HVAC appliances such as Packaged Terminal Air Conditioners (PTACs) that are installed in an external wall or window, usually near the floor, and that generally do not have any networking support. In many cases, PTACs have relatively basic controls consisting of a few buttons, and in some instances, a relatively basic display such as two or three 7-segment LEDs to display a setpoint and/or current temperature, and thus such appliances are generally not capable of supporting more than very basic controls over operation.

While it would be desirable to allow users to control PTACs in a similar manner to smart thermostats, it would also be desirable to limit users' control of individual PTACs to only the actual rooms in which they are staying, and only for the time periods in which such users are authorized to stay in the rooms. Otherwise, for example, a malicious or mischievous user, once set up to access a particular PTAC in a particular room, could later return and obtain access to the PTAC so long as the user was sufficiently close to the PTAC to establish a network connection therewith.

Therefore, a need continues to exist in the art for a manner of supporting user control of a PTAC or other room HVAC appliance through a user's mobile device, particularly in applications where Internet connectivity is limited or nonexistent.

SUMMARY

The herein-described embodiments address these and other problems associated with the art by utilizing a temporary authentication code that is presented by a PTAC or other room HVAC appliance to provide temporary authentication to a user staying in the room, and through which a user may authenticate his or her mobile device to control the room HVAC appliance. The temporary authentication code is valid for a limited duration, such that a user previously authenticated to the room HVAC appliance loses authentication, and is required to re-authenticate with a new temporary authentication code when the prior temporary authentication code has expired. As such, a user lacking physical access to the room HVAC appliance, such as after the user's stay has ended, is no longer able to access the room HVAC appliance.

Therefore, consistent with one aspect of the invention, a room Heating, Ventilation, and Air Conditioning (HVAC) appliance may include a housing configured to be installed in a room, an HVAC assembly disposed in the housing, a user interface disposed in the housing, a network interface, and a controller coupled to the HVAC assembly, the user interface, and the network interface. The controller is configured to operate the HVAC assembly to condition air in the room in response to a command received through the network interface from a mobile device, and is further configured to authenticate the mobile device prior to operating the HVAC assembly in response to the command by presenting a temporary authentication code to a user of the mobile device with the user interface, receiving a user-entered code from the mobile device through the network interface, and temporarily authenticating the mobile device in response to the user-entered code matching the temporary authentication code. The controller is also configured to automatically and periodically change the temporary authentication code such that the mobile device is automatically deauthenticated once the temporary authentication code has been changed after the mobile device is authenticated.

In some embodiments, the controller is configured to authenticate the mobile device during a first network connection established between the mobile device and the network interface, the command is a first command received during the first network connection and after the mobile device has been authenticated, and the controller is configured to, in response to a second network connection established between the mobile device after the first network connection has been terminated and before the temporary authentication code has been changed determine that the mobile device has already been authenticated, and operate the HVAC assembly to condition air in the room in response to a second command received from the mobile device through the network interface during the second network connection.

Also, in some embodiments, the controller is configured to store an identifier for the mobile device in connection with authenticating the mobile device during the first network connection, and to determine that the mobile device has already been authenticated by accessing the stored identifier for the mobile device. Further, in some embodiments, the controller is configured to discard the stored identifier for the mobile device in connection with changing the temporary authentication code. In some embodiments, the controller is configured to store the identifier for the mobile device on a permitted devices list that limits access to a limited number of authenticated devices, and to discard the stored identifier for the mobile device by clearing the permitted devices list.

In addition, in some embodiments, the controller is configured to determine that the mobile device has already been authenticated and operate the HVAC assembly to condition air in the room in response to the second command without requiring user re-entry of the user-entered code that matches the temporary authentication code.

In some embodiments, the controller is configured to present the temporary authentication code to the user of the mobile device with the user interface in response to a connection attempt initiated between the mobile device through the network interface. In addition, in some embodiments, the user interface presents the temporary authentication code to the user of the mobile device in a manner that requires the user to be present in the room in order to receive the temporary authentication code.

Moreover, in some embodiments, the user interface includes a temperature display, and the controller is configured to present the temporary authentication code to the user of the mobile device visually using the temperature display. In some embodiments, the temperature display includes a plurality of segmented display elements and the temporary authentication code includes a plurality of alphanumeric characters displayed on the temperature display. Moreover, in some embodiments, the user interface includes a speaker, and the controller is configured to present the temporary authentication code to the user of the mobile device audibly using the speaker.

In some embodiments, the controller is configured to automatically and periodically change the temporary authentication code by selecting a new temporary authentication code at each of a plurality of periodic intervals. In addition, in some embodiments, the controller is configured to automatically and periodically change the temporary authentication code by selecting a new temporary authentication code on a daily basis. In some embodiments, the controller is configured to automatically and periodically change the temporary authentication code by selecting a new temporary authentication code at a predetermined time each day. Moreover, in some embodiments, the room is a hotel room, and the predetermined time is based on a standard checkout time for the hotel room.

Also, in some embodiments, the network interface is a Bluetooth wireless network interface, and the controller is configured to authenticate the mobile device during a Bluetooth pairing operation. In some embodiments, the network interface is a Wi-Fi wireless network interface, and the controller is configured to authenticate the mobile device during a Wi-Fi connection operation. In addition, in some embodiments, the room HVAC appliance lacks Internet connectivity. Also, in some embodiments, the room HVAC appliance is a window Air Conditioning (AC) unit, a wall AC unit, a portable AC unit, or a Packaged Terminal Air Conditioning (PTAC) unit. Moreover, in some embodiments, the controller is configured to receive the user-entered code from the mobile device from an app executing on the mobile device.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

In embodiments consistent with the invention, a temporary authentication code may be generated by a PTAC or other room HVAC appliance and presented to a user of a mobile device to provide temporary authentication to the user's mobile device, thereby enabling the user to control the room HVAC appliance with the mobile device. The presentation of the temporary authentication code generally requires physical presence in a room within which the room HVAC appliance is installed, effectively providing a form of two factor authentication where physical presence in a location is one of the factors used in the authentication.

In the embodiments discussed in greater detail below, the room HVAC appliance may be used in a room of a hotel or other short-term rental property (which are collectively referred to hereinafter as a hotel), where the person or people granted access to the room is expected to change relatively frequently, e.g., on a daily or weekly basis, and where, for example, it is desirable to restrict access to the room HVAC appliance by an authenticated user once his or her access to the room has ended. However, it will be appreciated that a room HVAC appliance consistent with the invention may be used in any other suitable application for a room HVAC appliance, including in a room of an owned residential property, a long-term rental property, an office or other commercial or industrial property, etc.

As will become more apparent below, the temporary authentication code is valid for a limited duration, such that a user previously authenticated to the room HVAC appliance loses authentication, and is required to re-authenticate with a new temporary authentication code, when the prior temporary authentication code has expired. As such, a user lacking physical access to the room HVAC appliance, such as after the user's stay in a hotel room has ended, is no longer able to access the room HVAC appliance. While in some embodiments a temporary authentication code may be generated responsive to a user's attempt to connector or pair with the room HVAC appliance, in other embodiments the temporary authentication code may be generated on a time-dependent basis, and independent of any attempts to connect or pair with the room HVAC appliance.

In the embodiments discussed hereinafter, for example, a temporary authentication code may be generated, and later changed, automatically and periodically, e.g., at each of a plurality of periodic intervals, which in some embodiments may be equal in duration to one another, although the invention is not so limited. In some embodiments, for example, a temporary authentication code may be automatically and periodically changed on a daily basis (e.g., every 24 hours). In some instances, for example, a temporary authentication code may be automatically and periodically changed at a predetermined time each day, and in some instances, the predetermined time may be selected based upon a standard checkout time (e.g., 11:00 am or 12:00 pm). It may be desirable, for example, to set the predetermined time based on a standard checkout time for a hotel, e.g., within one, two, or more hours from the standard checkout time. While the invention is not so limited, it may be desirable to select a time that is after the standard checkout time, but before the standard check in time, to minimize the frequency that a guest would need to reauthenticate on the same day in which he or she started or ended his or her stay. It will be appreciated, however, that other intervals may be used in other embodiments, e.g., weekly intervals for room HVAC appliances used in vacation rentals.

In some embodiments, a room HVAC appliance may include a time of day clock, which may be set via user programming or automatically in various known manners (or received from a mobile device that connects with the room HVAC appliance), such that the time of day is available when determining when to change the temporary authentication code. In other embodiments, however, a room HVAC appliance may base temporary authentication code changes on a duration from when the room HVAC appliance was initially powered up, should no time of day be otherwise available to the room HVAC appliance.

As will also become more apparent below, a room HVAC appliance may be implemented in a number of manners, and may be considered to include any type of HVAC appliance that is suitable for conditioning the air in a particular room or zone of a building, e.g., via heat, cooling, or circulation. The embodiments hereinafter focus on room HVAC appliances such as window Air Conditioning (AC) units, wall AC units, portable AC units, and a Packaged Terminal Air Conditioning (PTAC) units, but the invention is not so limited. The functionality disclosed herein may also be used in some embodiments on other HVAC devices such as thermostats and whole building HVAC systems, as well as other types of appliances and electronic devices capable of being controlled by a mobile device.

Figure 1:
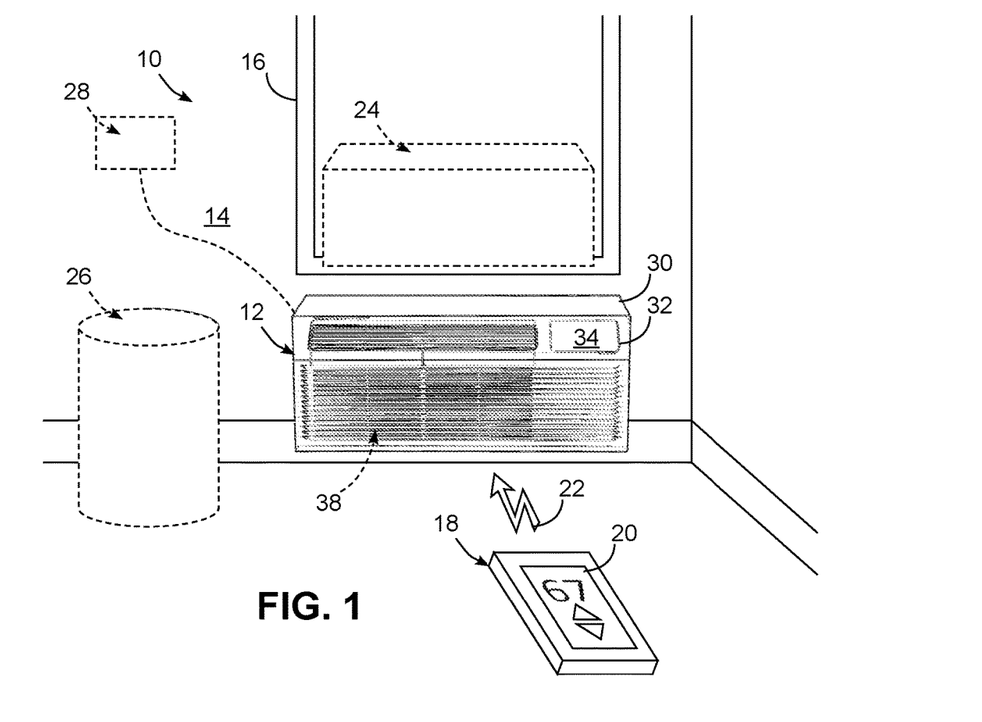
FIG. 1 is a perspective view of a hotel room including a room HVAC appliance and mobile device consistent with some embodiments of the invention.

FIG. 1, for example, illustrates a room 10 within which is disposed a PTAC-type of room HVAC appliance 12, e.g., mounted on a wall 14 thereof and under a window 16. In the illustrated embodiment, room 10 is a hotel room, although room 10 may be used for other purposes in other embodiments.

Room HVAC appliance 12 is controllable by a mobile device 18, e.g., a smart phone, a tablet, a laptop, etc. In some embodiments, mobile device 18 may execute an application (app) 20 through which the mobile device pairs with or connects to room HVAC appliance 12, sends commands to control room HVAC appliance 12, and/or receives status information from room HVAC appliance 12, e.g., over a wireless network as represented at 22.

While room HVAC appliance 12 is implemented in FIG. 1 as a PTAC unit, in other embodiments, other room HVAC appliances may incorporate the functionality described herein, e.g., a window AC unit 24, a portable HVAC unit 26. In addition, in some embodiments, a room HVAC appliance may be controlled by a thermostat 28, such that the logic used to control the room HVAC appliance and/or communicate with a mobile device is at least partially implemented in the thermostat.

Figure 2:
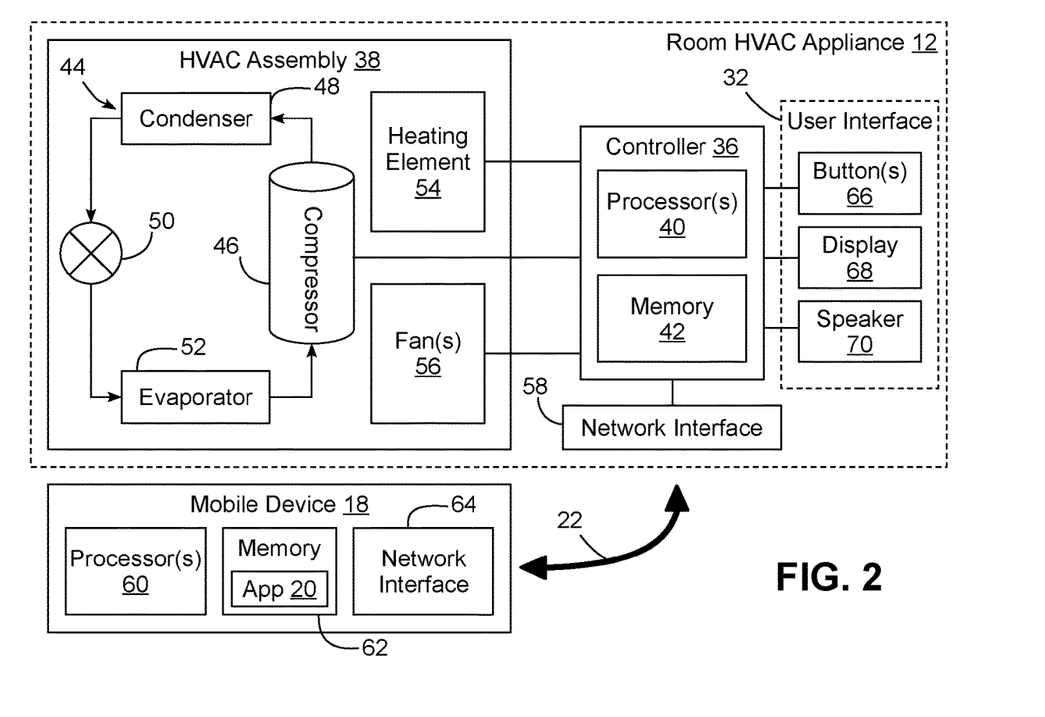
FIG. 2 is a block diagram of the room HVAC appliance and mobile device of FIG. 1.

With additional reference to FIG. 2, room HVAC appliance 12 may include a housing 30 configured to be installed in room 10, as well as a user interface 32 that in the illustrated embodiment is accessible behind a door 34 in housing 30. A controller 36 in housing 30 controls an HVAC assembly 38 to condition (e.g., cool, heat and/or ventilate) air in the room, and includes one or more processors 40 and one or more memories 42 within which may be stored program code or instructions for execution by the processor(s) 40. The memory may be embedded in controller 36, but may also be considered to include volatile and/or non-volatile memories, cache memories, flash memories, programmable read-only memories, read-only memories, etc., as well as memory storage physically located elsewhere from controller 36, e.g., in a mass storage device or on a remote computer interfaced with controller 36. Controller 36 may also be implemented as a microcontroller in some embodiments, and as such these terms are used interchangeably herein. Controller 36 may also include discrete circuit logic in some embodiments, e.g., including passive and/or active circuit components.

In some embodiments, controller 36 may operate under the control of an operating system and may execute or otherwise rely upon various computer software applications, components, programs, objects, modules, data structures, etc. In addition, controller 36 may also incorporate hardware logic to implement some or all of the functionality disclosed herein. Further, in some embodiments, the operational sequences performed by controller 36 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

HVAC assembly 38 generally provides one or more HVAC functions, e.g., heating, cooling and/or ventilation (e.g., air circulation). For example, for cooling, and in some instances, heating, a vapor-compression circuit 44 may be provided to circulate refrigerant between a compressor 46, condenser 48, expander 50, and evaporator 52. For cooling, for example, refrigerant in a state as a low pressure and low temperature vapor may be received by compressor 46, which pressurizes the refrigerant into a higher temperature and higher pressure vapor. This high temperature, high pressure vapor then passes through condenser 48, which functions as a heat exchanger to release heat to its surrounding environment, and the refrigerant then cools and condenses to a higher pressure liquid, and then passes through expander 50, e.g., an expansion valve or device, which abruptly causes the temperature to drop, and then through an evaporator 52, which functions as a heat exchanger that vaporizes the refrigerant and absorbs heat from its surrounding environment. The refrigerant then returns to compressor 46 as the low pressure and low temperature vapor.

In some embodiments, circuit 44 may be a reversible heat pump circuit capable of supplying both heat and cooling. HVAC assembly 38 may also include, in addition to or in lieu of circuit 44, one or more heating elements 54 (e.g., resistive electrical heating elements) to provide a heating function. One or more fans 56 may also be provided to circulate air, as well as supply heated or cooled air to the room 10. It will be appreciated that various manners of conditioning air in a room may be used in a room HVAC appliance, so the invention is not limited to the particular configuration illustrated herein.

Room HVAC appliance 12 also includes a network interface 58, e.g., a wireless network interface. Network interface 58, for example, may represent one or more network interfaces suitable for interfacing with external devices via wired and/or wireless networks such as Ethernet, Wi-Fi, Bluetooth, NFC, Thread, Zigbee, cellular and other suitable networks. Network interface 58, for example, interfaces with one or more mobile devices 18, which may include one or more processors 60, a memory 62, and a cooperative network interface 64, each of which may be configured in a similar or different manner to or from processors 40, memory 42 and network interface 58. Network interface 58 may also, in some embodiments, provide internet connectivity to room HVAC appliance 12, e.g., to obtain firmware updates, to provide maintenance or diagnostic functionality, etc.

Figure 3:
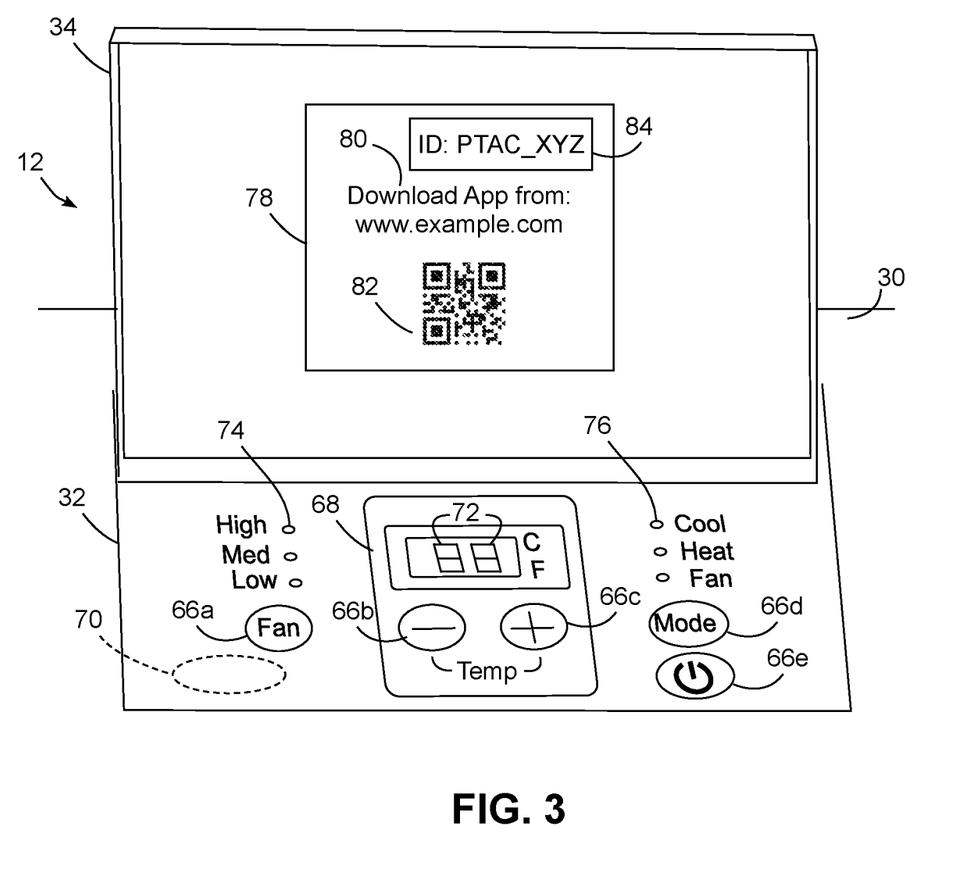
FIG. 3 is an enlarged perspective view of the user interface of the room HVAC appliance of FIGS. 1 and 2.

Room HVAC appliance 12, as noted above, also includes a user interface 32, which in some embodiments may include one or more buttons 66, a display 68, and in some instances, a speaker 70. In some embodiments, the user interface may be fairly basic in nature, and provide only limited controllability for a user. FIG. 3, for example, illustrates one implementation of user interface 32, includes a plurality of buttons 66a-66e, a display 68 including a plurality of segmented display elements 72 (e.g., LED or LCD 7-segment displays), as well as a number of additional indicators 74, 76. Button 66a controls a fan speed between high, medium and low settings (indicated by lighting one of indicators 74), buttons 66b and 66c control a temperature setpoint that is displayed by segmented display elements 72. Button 66d toggles between cool, heat, and fan only modes (indicated by lighting one of indicators 76), and button 66e powers the appliance on and off. Segmented display elements 72 may also display a current temperature in some embodiments. In addition, as will become more apparent below, segmented display elements 72 may also display a temporary authentication code whenever a mobile device is attempting to pair with or connect to the room HVAC appliance.

It may also be desirable in some embodiments to provide information to a user to assist with authenticating with the room HVAC appliance, e.g., using a sticker 78 or printed material on a back side of door 34. The information may include, for example, textual information 80 about a web site from which an app may be downloaded and/or authenticating instructions may be provided, a QR or bar code 82 that links to a web site from an app may be downloaded and/or authenticating instructions may be provided, or other information that is suitable for assisting a user with the authentication process. In addition, in some embodiments it may be desirable to provide an identifier 84 for the room HVAC appliance so that a user can select the correct room HVAC appliance to pair with or connect to. It will be appreciated, for example, that in a hotel or other multi-unit structure, a user's mobile device may be in the range of multiple room HVAC appliances, such that when the user attempts to initiate a pairing or connection operation, the user may be presented with multiple options. Each room HVAC appliance, for example, may broadcast an identifier to enable the user to select the room HVAC appliance matching the broadcast identifier. Other manners of identifying a particular room HVAC appliance to connect to may be used in other embodiments, as will be appreciated by those of ordinary skill having the benefit of the instant disclosure.

It will also be appreciated that while user interface 32 provides relatively basic user controls, in other embodiments, more sophisticated user controls may be provided, e.g., graphical and/or touchscreen displays, sliders, knobs, voice controls, gesture controls, etc., so the invention is not limited to the particular user interfaces described herein.

It will be appreciated that room HVAC appliance 12 may include various other components not illustrated in FIGS. 1-3, e.g., a power supply, various sensors (e.g., temperature and/or humidity sensors), etc. Other components and variations thereof will be appreciated by those of ordinary skill having the benefit of the instant disclosure.

Figure 4:
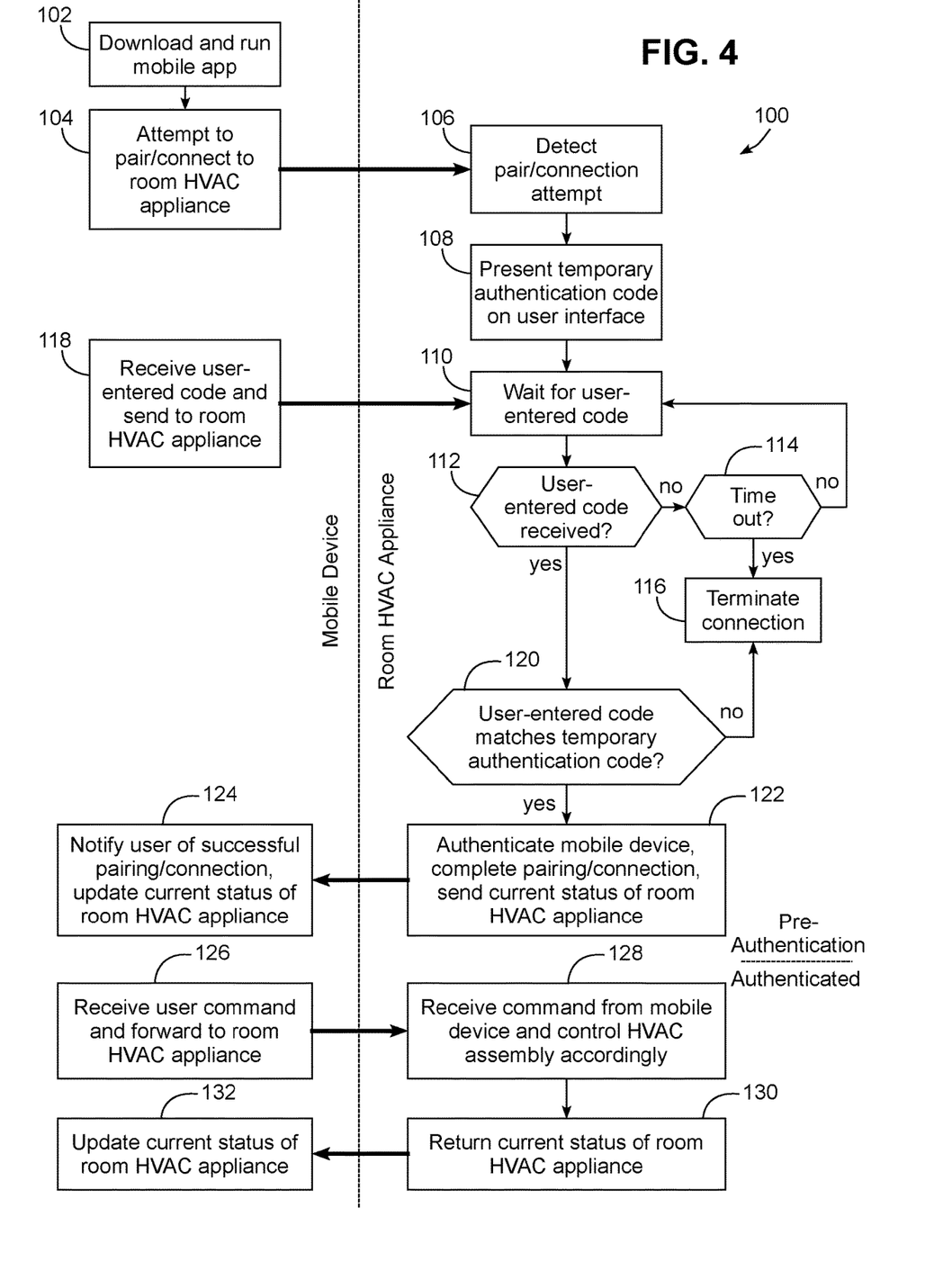
FIG. 4 is a flowchart illustrating an example operational sequence for authenticating the mobile device of FIGS. 1-3 to control the room HVAC appliance of FIGS. 1-3.

Now turning to FIG. 4, an example operational sequence 100 for authenticating a mobile device with room HVAC appliance 12 is illustrated in greater detail. Assuming, for example, that a user checks into the hotel room within which room HVAC appliance is installed, the user may first, in block 102, download and run a mobile app configured to pair with or connect to room HVAC appliance 12. The app may be offered, for example, by a manufacturer of the room HVAC appliance, or alternatively a hotel operator, a short-term rental provider, or other entity.

Next, in block 104, the user may attempt to pair with or connect to the room HVAC appliance using the app. The manner in which block 104 is implemented may vary depending upon the type of network supported by room HVAC appliance 12. For example, in some embodiments, a Bluetooth network may be supported, and room HVAC appliance 12 may broadcast a Bluetooth-compatible signal, including a unique identifier that identifies the room HVAC appliance, that a mobile device may detect and present to a user, so that the user can initiate a Bluetooth pairing process. As an alternative, in some embodiments, a Wi-Fi network may be supported, and room HVAC appliance 12 may operate as a hot spot that broadcasts a Wi-Fi compatible signal, including an SSID that identifies the room HVAC appliance, that a mobile device may detect and present to a user, so that the user can initiate a Wi-Fi connection process. For other types of networks, other appropriate pairing/connection processes may be used in the alternative.

In addition, in other embodiments, it may be desirable to require a user to place the room HVAC appliance in a pairing or connect mode before attempting to pair with or connect to the room HVAC appliance, e.g., by pressing one or more buttons or combinations of buttons on the user interface of the room HVAC appliance. By doing so, presence would be required in the room before even pairing or connecting may be initiated.

Once the pairing/connection attempt has been detected by the controller of the room HVAC appliance (block 106), the controller may present a temporary authentication code using the user interface, and desirably in a manner that requires that the user and mobile device be physically present within the room within which the room HVAC appliance is installed. Thus, for example, where a visual display 68 is used, the temporary authentication code may be displayed on the visual display, and it will be appreciated that, for example, if only a limited number of alphanumeric digits are supported on the display, a full temporary authentication code may be scrolled or otherwise displayed in multiple parts. As an alternative, where speaker 70 is used, the temporary authentication code may be audibly presented, e.g., spoken, to a user using a synthesized voice. Other manners of audibly and/or visually presenting a temporary authentication code may be used in other embodiments, e.g., by flashing one or more indicators, by presenting various colors, patterns, or animations, etc. In the embodiment illustrated in FIG. 3, for example, where two segmented display elements are provided and hexadecimal digits (0-9 and A-F) are supported for a temporary code, 256 unique codes may be supported, which may be sufficient for many applications. In other applications, additional digits and/or additional alphanumeric characters may be used to expand the number of possible codes and thereby reduce the likelihood of codes being repeated in nearby room HVAC appliances and/or during repeated visits.

Next, in block 110 the controller of the room HVAC appliance waits for the user-entered code to be provided by the mobile device over the connection therebetween. During this time, the receipt of the user-entered code may be queried in block 112, and a loop may be initiated to continue waiting until a sufficient duration has occurred, at which point a time out may be detected (block 114) and the connection terminated (block 116) if no user-entered code has been received within the time out duration. Assuming that the user-entered code is entered by the user via the app running on the mobile device and then forwarded to the room HVAC appliance prior to expiration of the time out duration (block 118), control passes from block 112 to block 120 to compare this user-entered code with the temporary authentication code. If the codes do not match, control passes to block 116 to terminate the connection. Otherwise, control passes from block 120 to block 122 to temporarily authenticate the mobile device, complete the pairing/connection operation, and optionally send the current status of the room HVAC appliance (e.g., setpoint temperature, room temperature, operational mode, fan speed, etc.) to the mobile device. In block 124, the mobile device also completes the pairing/connection operation on its end, notifies the user of the success of the operation, and optionally updates and displays the current status of the room HVAC appliance to the user using the app.

With the mobile device authenticated, the user may thereafter use the app to enter user commands, which are then forwarded by the mobile device to the room HVAC appliance (block 126), and once received, used to control the HVAC assembly of the room HVAC appliance (block 128). Once the status of the room HVAC appliance has been changed as a result of a user commend, the current status of the appliance may then be returned to the mobile device (block 130) and then updated on the app (block 132). Further user commands may also be processed in this manner so long as the mobile device remains connected to the room HVAC appliance.

Figure 5:
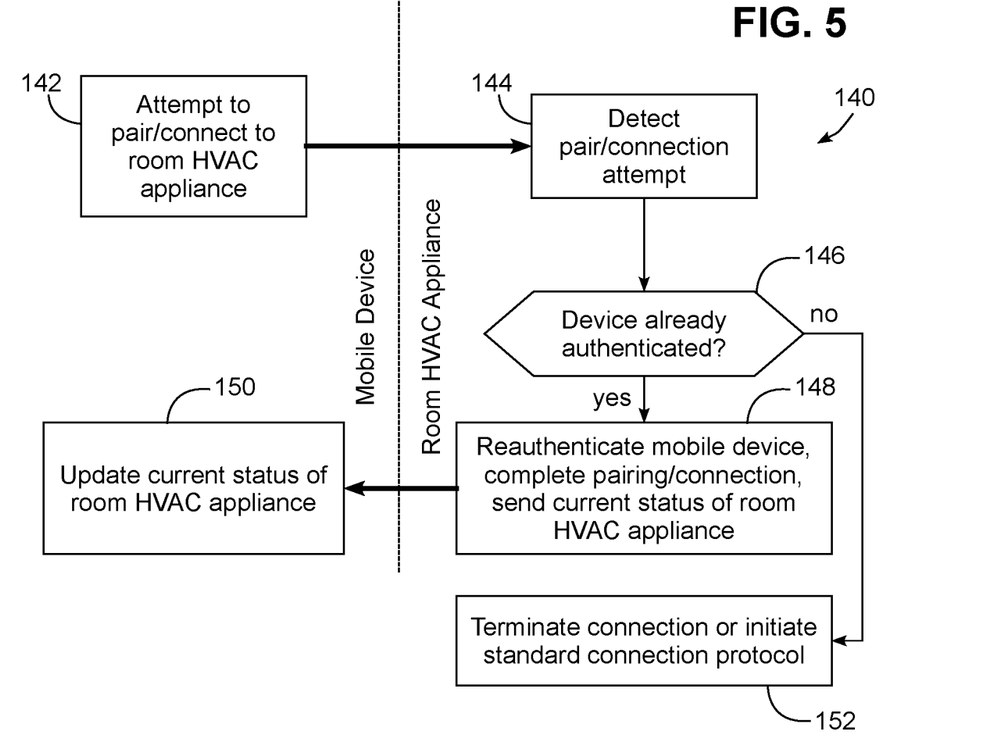
FIG. 5 is a flowchart illustrating an example operational sequence for reconnecting the mobile device and room HVAC appliance of FIGS. 1-3.

In some embodiments, a user may be required to re-enter the temporary authentication code each time a new connection is established between the mobile device and the room HVAC appliance (e.g., after the user leaves and then returns to the room). In other embodiments, however, it may be desirable to retain a record of the temporary authentication code in the mobile device and/or retain a record of the mobile device in the controller of the room HVAC appliance to allow the mobile device to reconnect to the room HVAC appliance without specific user interaction until such time as the temporary authentication code is changed. FIG. 5, for example, illustrates one example operational sequence 140 for reconnecting a mobile device and room HVAC appliance, e.g., after a user has left and returned to the room during his or her stay.

In this operational sequence, a new attempt is made by the mobile device to pair to or connect with the room HVAC appliance (block 142). In some embodiments, the mobile device may supply the user-entered code entered during the initial pairing/connection operation so that the user is not prompted to re-enter the code. The pairing/connection attempt is detected in block 144, and then a determination is made as to whether the mobile device is already authenticated in block 146. In some embodiments, block 146 may determine the prior authentication by virtue of the receipt of the correct temporary authentication code in the initial attempt, or alternatively, based upon other identifying information associated with the mobile device, e.g., an identifier supplied via the connection, a MAC address, etc. If the device is determined to have already been authenticated, control passes from block 146 to block 148 to temporarily reauthenticate the mobile device, complete the pairing/connection operation, and optionally send the current status of the room HVAC appliance (e.g., setpoint temperature, room temperature, operational mode, fan speed, etc.) to the mobile device. In block 150, the mobile device also completes the pairing/connection operation on its end, and optionally updates and displays the current status of the room HVAC appliance to the user using the app. In some embodiments, the user may also be notified of the reestablishment of the connection. Thus, it will be appreciated that, in this embodiment, once the mobile device is authenticated, the user may easily control the room HVAC appliance via the app on the mobile device until such time as the temporary authentication code has changed.

Returning to block 146, if a determination is made that the device is not already authenticated, control passes to block 152 to either terminate the connection, or alternatively initiate the standard connection protocol for unauthenticated mobile devices (discussed above in connection with blocks 104-124), whereby the temporary authentication code is presented to the user and the user enters the code in order to authenticate the mobile device.

Figure 6:
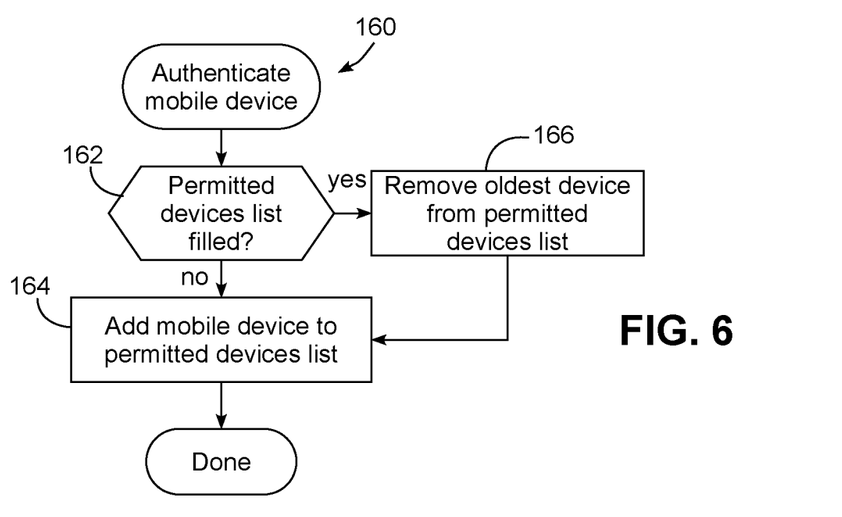
FIG. 6 is a flowchart illustrating an example operational sequence for authenticating a mobile device in block 122 of FIG. 4.

The manner in which a mobile device may be authenticated and reauthenticated may vary in different embodiments. For example, as illustrated by operational sequence 160 of FIG. 6, one manner of authenticating a mobile device may rely upon a permitted devices list, which may be maintained by the controller of the room HVAC appliance, and which may maintain identifying information regarding each mobile device that is currently authenticated with the room HVAC appliance. Thus, for example, during block 122 of FIG. 4, once a mobile device has provided the correct code, authentication may proceed as illustrated in FIG. 6, by first determining if the permitted devices list is currently filled in block 162, and if not, adding the mobile device to the permitted devices list in block 164. Otherwise, if the list is currently filled, block 162 may pass control to block 166 to remove the oldest mobile device (e.g., determined from a position in the list or a timestamp) from the permitted devices list, and then pass control to block 164 to add the mobile device to the now vacant slot in the list.

Each slot in the permitted devices list may therefore include identifying information about each authenticated mobile device (e.g., a unique identifier, a MAC address, etc.), and in some instances, information suitable for determining an order in which the mobile device was authenticated relative to other mobile devices in the list. Other manners of retaining information about a mobile device to facilitate reauthorization of a mobile device may be used in other embodiments, and will be appreciated by those of ordinary skill having the benefit of the instant disclosure.

Figure 7:
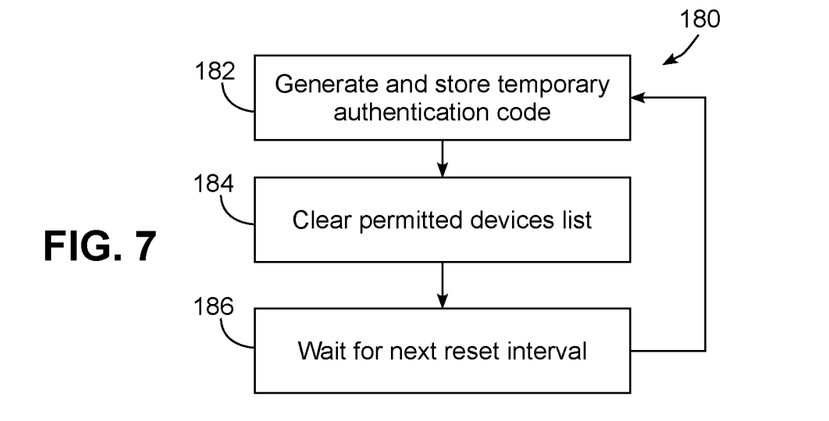
FIG. 7 is a flowchart illustrating an example operational sequence for resetting a temporary authentication code in the room HVAC appliance of FIGS. 1-3.

Now turning to FIG. 7, this figure illustrates an example operational sequence 180 for changing or resetting a temporary authentication code in room HVAC appliance 12. In operational sequence 180, for example, a temporary authentication code may be generated and stored in block 182, and in association with generating the temporary authentication code, the permitted devices list may optionally be cleared in block 184. The room HVAC appliance then waits for a next reset interval in block 186, and returns to block 182 to change the temporary authentication code.

As noted above, in some embodiments the reset interval may be one day or 24 hours in duration, and in some embodiments, may be based at least in part on a checkout time. Other durations and/or start times (e.g., start times based on the time in which the room HVAC appliance was initially powered up) may be used in other embodiments. In addition, it should be noted that the generation and changing of the temporary authentication code is generally not timed based upon receiving a pairing or connection attempt by a mobile device, although in other embodiments, the timing of a temporary authentication code generation or change could be triggered from a pairing or connection attempt.

It will also be appreciated that once the temporary authentication code has been changed, and in some instances, once the permitted devices list has been cleared, the mobile device is effectively automatically deauthenticated. This does not necessarily prevent the user from reauthenticating with the room HVAC appliance via the process described above in connection with FIG. 4, so long as the user still has physical access to the room (e.g., in the case of a multi-day stay).

Figure 8:
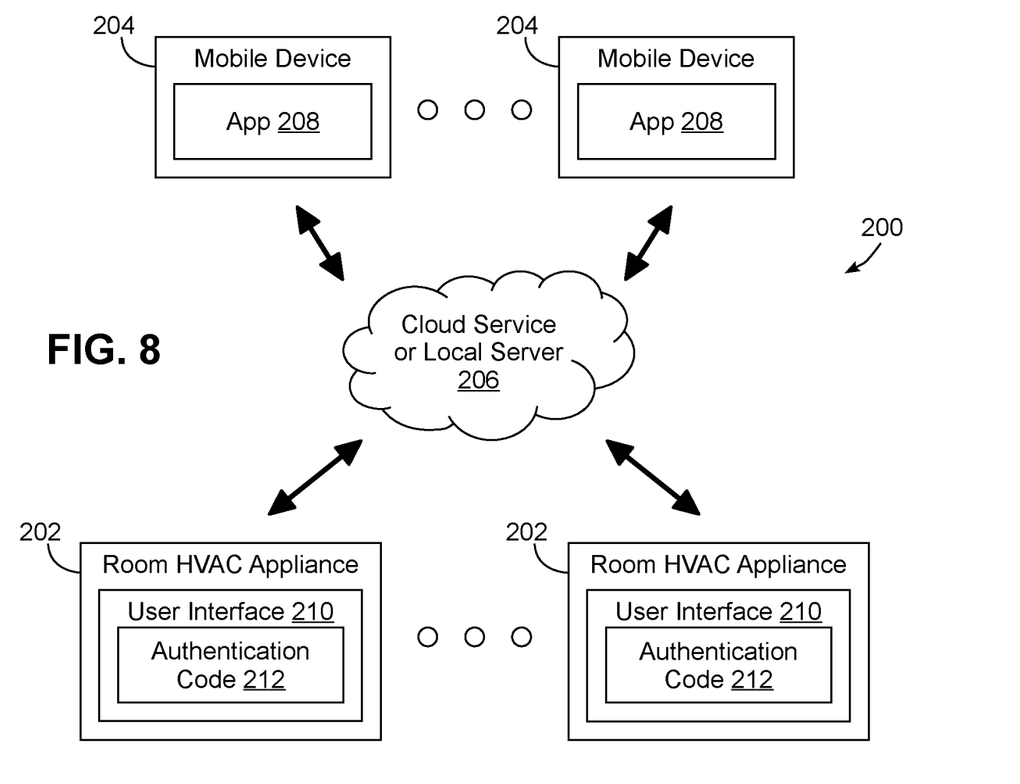
FIG. 8 is a block diagram of a server-enabled system for authenticating mobile devices with room HVAC appliances consistent with some embodiments of the invention.

As noted above, the temporary authentication codes described herein may be particularly well suited to room HVAC appliances used in applications where Internet availability for the room HVAC appliances is spotty or nonexistent, and where a direct network connection may be required between a mobile device and a room HVAC appliance. In other embodiments, however, and as illustrated in FIG. 8, it may be desirable to support a server-based approach, e.g., in a server-based system 200 where multiple network-connected room HVAC appliances 202 may be in communication with one or more mobile devices 204 through a cloud service or local server 206. For example, a cloud service may be used to support multiple geographically-distributed locations, while a local server may be used to support a single multiple-occupancy location such as a hotel or office building. Each mobile device 204 may run an appropriate app 208, and each room HVAC appliance may include an appropriate user interface 210 for presenting a temporary authentication code 212 to a user physically present in the room in which the room HVAC appliance is installed. Generation of and changes to temporary authentication codes may be initiated internally in a room HVAC appliance 202 in some embodiments, or alternatively initiated in the cloud service or local server 206 and then distributed to the room HVAC appliance in some embodiments, but in general it is still desirable to present the temporary authentication codes to users in such a manner that physical presence in the rooms in which the room HVAC appliances are installed is required in order to authenticate with a particular room HVAC appliance. Communication between mobile devices and room HVAC appliances may be made through the cloud service or local server 206, although some direct communication between a mobile device and a room HVAC appliance may still be supported in some embodiments. Other variations will be appreciated by those of ordinary skill having the benefit of the instant disclosure.

It will be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another. Various additional modifications may be made to the illustrated embodiments consistent with the invention. Therefore, the invention lies in the claims hereinafter appended.

What is claimed is:

1. A room Heating, Ventilation, and Air Conditioning (HVAC) appliance, comprising:
 a housing configured to be installed in a room;
 an HVAC assembly disposed in the housing;
 a user interface disposed in the housing;
 a network interface; and
 a controller coupled to the HVAC assembly, the user interface, and the network interface, the controller configured to operate the HVAC assembly to condition air in the room in response to a command received through the network interface from a mobile device;
 wherein the controller is further configured to authenticate the mobile device prior to operating the HVAC assembly in response to the command by:
  presenting a temporary authentication code to a user of the mobile device with the user interface;
  receiving a user-entered code from the mobile device through the network interface; and
  temporarily authenticating the mobile device in response to the user-entered code matching the temporary authentication code;
 wherein the controller is configured to receive the command from the mobile device after temporarily authenticating the mobile device and to operate the HVAC assembly to condition air in the room in response to receiving the command from the mobile device; and
 wherein the controller is configured to automatically and periodically change the temporary authentication code such that the mobile device is automatically deauthenticated once the temporary authentication code has been changed after the mobile device is authenticated.

2. The room HVAC appliance of claim 1, wherein the controller is configured to authenticate the mobile device during a first network connection established between the mobile device and the network interface, wherein the command is a first command received during the first network connection and after the mobile device has been authenticated, and wherein the controller is configured to, in response to a second network connection established between the mobile device after the first network connection has been terminated and before the temporary authentication code has been changed:

determine that the mobile device has already been authenticated; and operate the HVAC assembly to condition air in the room in response to a second command received from the mobile device through the network interface during the second network connection.

3. The room HVAC appliance of claim 2, wherein the controller is configured to store an identifier for the mobile device in connection with authenticating the mobile device during the first network connection, and to determine that the mobile device has already been authenticated by accessing the stored identifier for the mobile device.

4. The room HVAC appliance of claim 3, wherein the controller is configured to discard the stored identifier for the mobile device in connection with changing the temporary authentication code.

5. The room HVAC appliance of claim 4, wherein the controller is configured to store the identifier for the mobile device on a permitted devices list that limits access to a limited number of authenticated devices, and to discard the stored identifier for the mobile device by clearing the permitted devices list.

6. The room HVAC appliance of claim 2, wherein the controller is configured to determine that the mobile device has already been authenticated and operate the HVAC assembly to condition air in the room in response to the second command without requiring user re-entry of the user-entered code that matches the temporary authentication code.

7. The room HVAC appliance of claim 1, wherein the controller is configured to present the temporary authentication code to the user of the mobile device with the user interface in response to a connection attempt initiated between the mobile device through the network interface.

8. The room HVAC appliance of claim 1, wherein the user interface presents the temporary authentication code to the user of the mobile device in a manner that requires the user to be present in the room in order to receive the temporary authentication code.

9. The room HVAC appliance of claim 1, wherein the user interface includes a temperature display, and the controller is configured to present the temporary authentication code to the user of the mobile device visually using the temperature display.

10. The room HVAC appliance of claim 9, wherein the temperature display includes a plurality of segmented display elements and the temporary authentication code includes a plurality of alphanumeric characters displayed on the temperature display.

11. The room HVAC appliance of claim 8, wherein the user interface includes a speaker, and the controller is configured to present the temporary authentication code to the user of the mobile device audibly using the speaker.

12. The room HVAC appliance of claim 1, wherein the controller is configured to automatically and periodically change the temporary authentication code by selecting a new temporary authentication code at each of a plurality of periodic intervals.

13. The room HVAC appliance of claim 1, wherein the controller is configured to automatically and periodically change the temporary authentication code by selecting a new temporary authentication code on a daily basis.

14. The room HVAC appliance of claim 13, wherein the controller is configured to automatically and periodically change the temporary authentication code by selecting a new temporary authentication code at a predetermined time each day.

15. The room HVAC appliance of claim 13, wherein the room is a hotel room, and wherein the predetermined time is based on a standard checkout time for the hotel room.

16. The room HVAC appliance of claim 1, wherein the network interface is a Bluetooth wireless network interface, and wherein the controller is configured to authenticate the mobile device during a Bluetooth pairing operation.

17. The room HVAC appliance of claim 1, wherein the network interface is a Wi-Fi wireless network interface, and wherein the controller is configured to authenticate the mobile device during a Wi-Fi connection operation.

18. The room HVAC appliance of claim 1, wherein the room HVAC appliance lacks Internet connectivity.

19. The room HVAC appliance of claim 1, wherein the room HVAC appliance is a window Air Conditioning (AC) unit, a wall AC unit, a portable AC unit, or a Packaged Terminal Air Conditioning (PTAC) unit.

20. The room HVAC appliance of claim 1, wherein the controller is configured to receive the user-entered code from the mobile device from an app executing on the mobile device.

* * * * *